C. DOESCHER.
SOCKET CAP.
APPLICATION FILED DEC. 29, 1910.
985,252.  Patented Feb. 28, 1911.
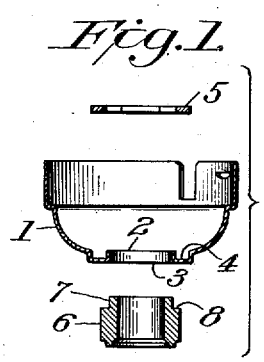
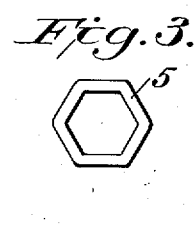
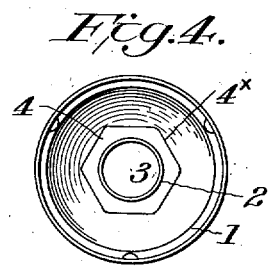
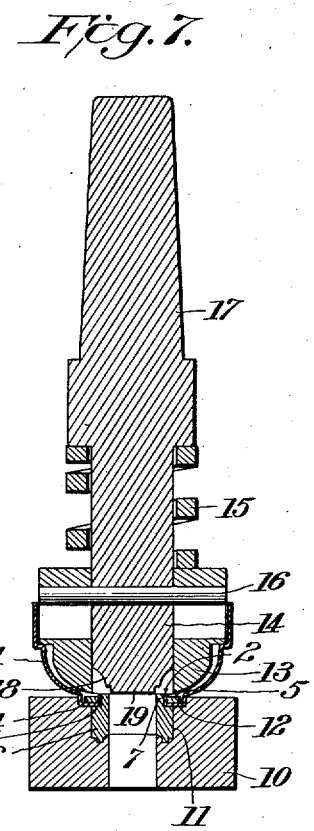
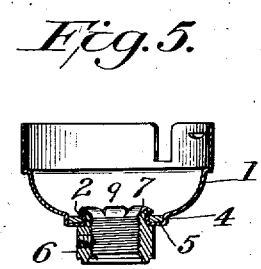
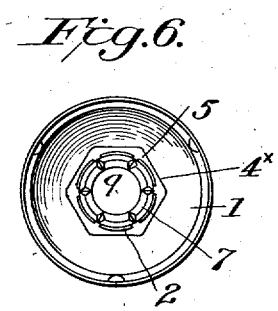
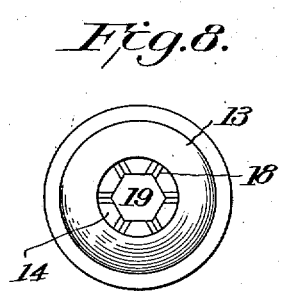
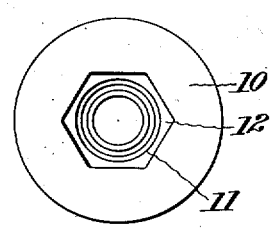
Witnesses
C. W. Walker
Lillie M. Perry
Inventor
Charles Doescher
by
W. H. Finckel
Attorney

UNITED STATES PATENT OFFICE.

CHARLES DOESCHER, OF WATERBURY, CONNECTICUT, ASSIGNOR TO SCOVILL MANUFACTURING COMPANY, OF WATERBURY, CONNECTICUT, A CORPORATION OF CONNECTICUT.

SOCKET-CAP.

985,252.  Specification of Letters Patent.  Patented Feb. 28, 1911.

Application filed December 29, 1910. Serial No. 599,984.

*To all whom it may concern:*

Be it known that I, CHARLES DOESCHER, a citizen of the United States, residing at Waterbury, in the county of New Haven, and State of Connecticut, have invented a certain new and useful Improvement in Socket-Caps, of which the following is a full, clear, and exact description.

As very commonly used, the metal cap of electric light sockets is provided with an applied hub, internally screwthreaded to admit of its being screwed on to the light fixture. This hub is usually cut from solid red brass and machined to shape, and has a flange or other means which is upset or headed up in a hole in the cap. The cap is usually of sheet brass and quite thin. Since there is considerable strain put upon the cap in applying the hub to it, and in screwing the socket to a fixture, it is obvious that the uniting of a hub and cap of such relatively diverse and unequal thickness and strength, presents practical difficulties of considerable complexity. Various means have been used to meet these difficulties.

The present invention is designed to enable manufacturers to produce sockets with a strain-resisting union of hub and cap in a simple and economical manner.

This invention consists of a cap or shell having a continuous, inwardly projecting circular flange surrounding its hub opening, and an exteriorly polygonal recess surrounding said flange, in which is arranged a polygonal washer, the shape of the recess serving to locate the washer therein unerringly, the thickness of the washer being about equal to the depth of the flange, and a hub having a flange which also is about equal in length to the depth of the flange, and located within the hub-opening and flange of the cap, the construction being such that the parts may be accurately placed within the staking tools to insure alinement of the parts to effect the uniform and unerring squeezing of the metal of the hub flange and cap flange in the several angles of the washer by lateral displacement of the metal of these flanges, in order to effect a rigid and secure union of the hub and cap sufficient to resist the twisting action incident to screwing the cap or socket upon a fixture.

The holding effect may be increased by roughening or knurling the hub flange exteriorly, thereby increasing its grasp upon the cap flange.

In the accompanying drawings, illustrating the invention, in the several figures of which like parts are similarly designated, Figure 1 shows in cross-section, the three parts of the structure, detached. Fig. 2 is a perspective view of the preferred form of flanged hub. Fig. 3 is a plan view of the washer. Fig. 4 is an inside plan view of the cap or shell. Fig. 5 is a longitudinal section of the assembled parts. Fig. 6 is an inside plan view of the structure shown in Fig. 5. Fig. 7 is a longitudinal section showing the staking tools as used. Fig. 8 is a bottom plan view of the staking punch and its holder. Fig. 9 is a top plan view of the die.

The cap or shell 1 may be of any approved metal and configuration, and differs from the ordinary cap in having the solid, continuous or unbroken circular flange 2 extending within it and surrounding the hub opening or hole 3, and also in having the recess 4 encircling the flange 2 and made with a polygonal periphery $4^x$, as shown in Figs. 4 and 6. The cap flange and this recess are of substantially equal depth. A washer 5 is arranged in this recess and it is of polygonal form, as shown in Figs. 3 and 6, so that when in place, it will not turn or slip around in the recess. This washer is of a thickness substantially equal to the depth of the flange, so that said flange is practically backed up by the washer.

The hub 6 has a flange 7 and an adjacent shoulder 8, and may be of any usual construction, excepting that its flange 7 preferably is knurled or otherwise roughened, as shown in Fig. 2, to increase its grasp or grip on the cap flange when the parts are assembled. The flange 7 is substantially equal in length to the depth of the shell or cap flange so as to obtain the greatest possible extent of interlocking contact between them. The flange 7 is circular.

When the cap or shell, the washer and the hub are assembled, as shown in Fig. 7, any suitable staking tools may be used for uniting them, as shown at 9, Figs. 5 and 6. It is preferred to unite these parts rigidly, so as to prevent relative turning thereof, by lateral displacement of the metal of the flanges at intervals corresponding in number with the number of angles in the polygonal washer and in the direction of the longitudinal axis of the cap and in extent equal to the length or depth of the flanges.

The staking tools may comprise a die 10, having a matrix 11 to receive the hub, and a surrounding peripherally polygonal matrix 12, Fig. 9, to receive the polygonal projection of the cap in which the recess 4 exists, so that the cap and its contained washer may be accurately located with respect to the punch, to insure the squeezing of the metal of the flanges of the hub and cap into the angles of the washer. The punch holder 13 is shaped to fit the interior of the cap and rest upon the washer. The punch 14 is arranged in this holder and has a longitudinal movement therein under control of the spring 15 and slot and pin connection 16. The punch has a shank 17 by which it may be mounted in a suitable press. The face of the punch, as shown in Figs. 7 and 8, has a series of radially disposed edged and tapering ribs 18 disposed on curved lines and merging in a centering projection 19, which enters the hub when the punch descends to its work, and upon such descent the ribs 18 act upon the hub flange and through it upon the cap flange and spread or squeeze the metal of these flanges laterally into the angles in the washer, thereby interlocking these three parts and the cap securely, and preventing their relative rotation when the cap or the socket of which it is a part, is screwed onto a fixture. The polygonal recess 4 prevents any dislocation of the washer in the process of assembling and staking the parts, and not only so, but alines the angles of the washer with the ribs of the punch. The washer, therefore, is not necessarily deformed in the act of staking, but substantially retains its integrity, while serving to back up the cap or shell flange. The stakings extend the full length or depth of the flanges, in the direction of the longitudinal axis of the cap and thus afford the greatest possible extent of resistance to the twisting strains exerted in screwing the structure to a fixture. In this operation of staking, it will occur frequently, if not always, that the inner edges of the flanges will be more or less slightly split, and this will enhance the strain-resisting quality of the union.

One of the fundamental elements of the construction is the drawing down of the cap stock to form the integral, circular inwardly extending hub-hole or cap flange, whereby the strength of the cap is augmented and the hold of the hub rendered more secure in comparison with prior constructions. In some prior constructions the cap flange has been folded back upon itself or the cap when the hub is clenched in the hub-hole, and while this construction may reinforce the strength of the cap at the place of union, it adds little if anything to the effectiveness of the joint in resisting twisting or rotary strains in applying the socket to a fixture, whereas the straight and unfolded cap flange and the axially disposed displacements gain as well the reinforcing of the cap and the rotation-resisting effect.

Where a polygonal hole was used in the shell or cap and a corresponding washer, it was necessary to have the angles of the two coincide in order to properly stake in the hub, so as to effect a satisfactory union, because the metal of the hub was supposed to be squeezed horizontally into the angles of the polygonal hole and washer. If the staking punch were not located or registered truly with these angles, or if the hole and washer were not arranged with their angles alined, the very purpose of these angular parts would be defeated, and the joint rendered ineffective, and this difficulty was of frequent occurrence in actual practice. In the present invention, these objections are avoided. The cap flange is drawn down circularly within the shell or cap for a depth substantially equal to the thickness of the surrounding washer and the length of the hub flange, and, hence, instead of having a thin sheet metal portion of the shell or cap squeezed in between the shoulder of the hub and the washer, as in the old construction, there is a considerable length of metal so staked, and the result is that the hub and cap are held securely against the twisting or rotation incident to securing the socket to a fixture. The use of the polygonal recess 4 insures the proper location of the angles of the washer with respect to the staking tools, and thus the stakings are properly located in an automatic way, or without further care upon the part of the operator, than to see that the shell or cap is properly placed in the matrix 12, the angles of which, of course, correspond with the angles of the washer and the staking ribs 18 of the punch. The polygonal form of the washer and its retaining recess serve to prevent the washer from turning.

The invention is not limited to the design shown for the caps of electric light sockets, and any other expedient than the polygonal recess in the cap may be used to locate the polygonal washer for staking purposes.

As already sufficiently indicated, the cap is designed for use primarily on the sockets of electric light bulbs. The invention is applicable to any style of cap or socket using a hub connection for attachment to a fixture.

What I claim is:—

1. A cap having a hub-hole and a surrounding inwardly extending flange, a polygonal washer surrounding said flange, means to locate the washer in the cap, and a flanged hub inserted in said hole and projecting within said flange, the cap and hub flanges and the washer having substantially equal contact surfaces, and laterally disposed stakings impressed in the flanges and extending into and engaging the angles of the washer, said stakings substantially coequal with the length or depth of the flanges and extending in the direction of the longitudinal axis of the cap.

2. A cap having a hub-hole and a surrounding inwardly extending flange, a recess surrounding said flange and having a polygonal perimeter, a polygonal washer arranged in said recess and surrounding the flange, and a hub having a flange arranged within said cap flange, the washer and the cap and hub flanges having substantially coextensive contact surfaces, and laterally disposed stakings impressed in the flanges and extending into and engaging the angles of the washer, said stakings substantially coequal with the length or depth of the flanges and extending in the direction of the longitudinal axis of the cap.

3. A cap having a hub-hole and a surrounding inwardly extending flange, a recess surrounding said flange and having a polygonal perimeter, a polygonal washer arranged in said recess and surrounding the flanges, and a hub having a flange arranged within said cap flange and peripherally knurled, the washer and the cap and hub flanges having substantially coextensive contact surfaces, and laterally disposed stakings impressed in the flanges and extending into and engaging the angles of the washer, said stakings substantially coequal with the length or depth of the flanges and extending in the direction of the longitudinal axis of the cap.

In testimony whereof I have hereunto set my hand this 28 day of December A. D. 1910.

CHARLES DOESCHER.

Witnesses:
PERCY WARNER,
E. A. HYDE.

---

Correction in Letters Patent No. 985,252.

It is hereby certified that in Letters Patent No. 985,252, granted February 28, 1911, upon the application of Charles Doescher, of Waterbury, Connecticut, for an improvement in "Socket-Caps," an error appears in the printed specification, requiring correction as follows: Page 1, line 14, the word "red" should read *rod*; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.* rounding inwardly extending flange, a polygonal washer surrounding said flange, means to locate the washer in the cap, and a flanged hub inserted in said hole and projecting within said flange, the cap and hub flanges and the washer having substantially equal contact surfaces, and laterally disposed stakings impressed in the flanges and extending into and engaging the angles of the washer, said stakings substantially coequal with the length or depth of the flanges and extending in the direction of the longitudinal axis of the cap.

2. A cap having a hub-hole and a surrounding inwardly extending flange, a recess surrounding said flange and having a polygonal perimeter, a polygonal washer arranged in said recess and surrounding the flange, and a hub having a flange arranged within said cap flange, the washer and the cap and hub flanges having substantially coextensive contact surfaces, and laterally disposed stakings impressed in the flanges and extending into and engaging the angles of the washer, said stakings substantially coequal with the length or depth of the flanges and extending in the direction of the longitudinal axis of the cap.

3. A cap having a hub-hole and a surrounding inwardly extending flange, a recess surrounding said flange and having a polygonal perimeter, a polygonal washer arranged in said recess and surrounding the flanges, and a hub having a flange arranged within said cap flange and peripherally knurled, the washer and the cap and hub flanges having substantially coextensive contact surfaces, and laterally disposed stakings impressed in the flanges and extending into and engaging the angles of the washer, said stakings substantially coequal with the length or depth of the flanges and extending in the direction of the longitudinal axis of the cap.

In testimony whereof I have hereunto set my hand this 28 day of December A. D. 1910.

CHARLES DOESCHER.

Witnesses:
PERCY WARNER,
E. A. HYDE.

---

Correction in Letters Patent No. 985,252.

It is hereby certified that in Letters Patent No. 985,252, granted February 28, 1911, upon the application of Charles Doescher, of Waterbury, Connecticut, for an improvement in "Socket-Caps," an error appears in the printed specification, requiring correction as follows: Page 1, line 14, the word "red" should read *rod*; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*

Correction in Letters Patent No. 985,252.

It is hereby certified that in Letters Patent No. 985,252, granted February 28, 1911, upon the application of Charles Doescher, of Waterbury, Connecticut, for an improvement in "Socket-Caps," an error appears in the printed specification, requiring correction as follows: Page 1, line 14, the word "red" should read *rod*; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*